United States Patent [19]
Thomson

[11] Patent Number: 5,546,358
[45] Date of Patent: Aug. 13, 1996

[54] DEVICE FOR ASSESSING AN IMPACT OF A PROJECTILE WITH A TARGET USING OPTICAL RADIATION

[75] Inventor: George M. Thomson, Churchville, Md.

[73] Assignee: The United States of America as represented by the Secretary of The Army, Washington, D.C.

[21] Appl. No.: 406,215

[22] Filed: Mar. 7, 1995

[51] Int. Cl.$^6$ ........................................................ G01S 3/80
[52] U.S. Cl. ............................................ 367/128; 102/513
[58] Field of Search ........................... 367/128; 89/41.06, 89/41.08; 102/513, 336, 282; 273/372, 363, 418; 356/141.1

[56] References Cited

U.S. PATENT DOCUMENTS

| | | | |
|---|---|---|---|
| 4,015,258 | 3/1977 | Smith et al. | 89/41.06 |
| 4,040,744 | 8/1977 | Schertz et al. | 356/141.1 |
| 4,202,246 | 5/1980 | Schertz et al. | 89/41.06 |
| 4,302,259 | 11/1981 | Ward | 102/513 |
| 4,617,179 | 6/1987 | Synofzik et al. | 102/513 |
| 4,882,997 | 11/1989 | Baxter et al. | 102/513 |

OTHER PUBLICATIONS

Silicon Photodiode, Model HFD1100, EG&G Photon Devices Inc., Salem, MA.
Indium Antimonide Detector, Model J10D–M920–S05M–60, EG&G Judson Inc., Montgomeryville, PA.
Measurement of indicator emission spectra were carried out by Mr. Charles Stumpfel, US Army Research Laboratory.
D. Savick and E. Baur, "Test Performance Characteristics For a 120 MM Perforated Muzzle Brake (U)," Ballistic Research Laboratory, Aberdeen Proving Ground, MD. (Confidential).
J. Bornstein, Weapons Technology Dir., US Army Research Laboratory, Aberdeen Proving Ground, MD. (Private Communication).

*Primary Examiner*—Daniel T. Pihulic
*Attorney, Agent, or Firm*—Freda L. Krosnick; Frank J. Dynda

[57] ABSTRACT

A device for assessing an impact of a projectile with a target using optical radiation from the flash of the impact. The invention includes an optical radiation detector, which detects optical radiation from the impact flash using optical, electronic and optoelectronic devices. The optical radiation detector is situated on a tank firing the projectile at a target. Further included is an optical radiation augmenter, which is a pyrotechnic material, mountable on a projectile, for augmenting the flash of the projectile impact with the target. By analyzing the signatures of pyrotechnic materials using the optical radiation detector, one can easily identify which projectile impacted the target, determine a distance traveled by the projectile, and assess the projectile impact by ascertaining whether the projectile perforated the target.

9 Claims, 5 Drawing Sheets

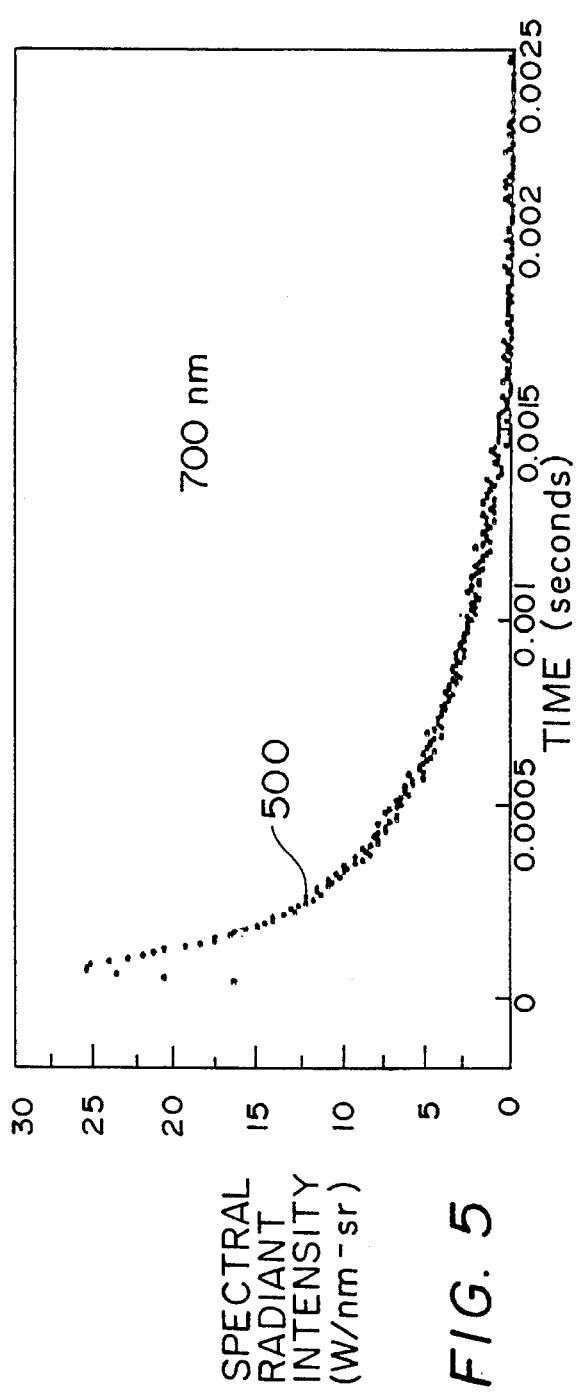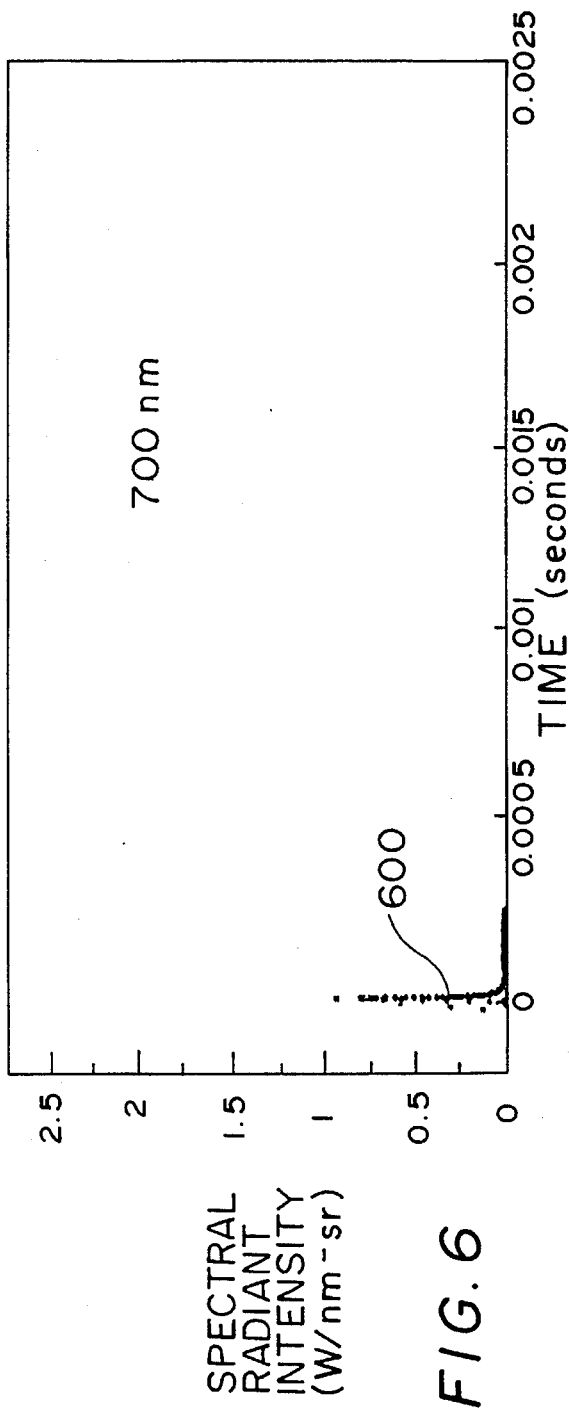

DEVICE FOR ASSESSING AN IMPACT OF A PROJECTILE WITH A TARGET USING OPTICAL RADIATION

FIELD OF THE INVENTION

The invention relates to devices for detecting radiant energy and more specifically to a device for assessing an impact of a projectile with a target by detecting optical radiation from the flash of the impact.

BACKGROUND OF THE INVENTION

The presence of armored vehicles has become ever more important in modern warfare, and their defeat an ever growing challenge. Typically, to disable an armored vehicle, a gun fires a projectile in order to perforate the protective mantle of the armor. Two types of armor-piercing ballistic projectiles have been created for this purpose. The first type is the shaped charge munition. On contact with the armor, this projectile uses an explosive to compress a thin shell of metal into a plastic jet traveling at speeds of several kilometers per second which penetrates the armor. The second type is the kinetic energy (KE) projectile, comprising a narrow rod of dense, hard metal launched against the target at one to two kilometers per second, whose impact overmatches the sheer strength of the armor.

In the most common type of anti-armor encounter—tank-on-tank combat—each tank must quickly determine the results of its firing. If the opponent is not hit and defeated, then prompt adjustment of firing is required. If, however, the opponent is defeated, then the next most immediate threat can be attacked.

Tanks typically see numerous flashes from projectile impacts and tank muzzle blasts during a battle. The resulting confusion may be critical to the outcome of the battle. To assess the effect of the projectile impacting the target, a tank crew has to rely on their own observations through an infrared (IR) or visible light gun sight. Such observations consist of detecting brief bursts of light near a poorly-defined target image. The intervening distance, smoke, dust and weather may, however, prevent the tank crew from accurately assessing the results of the impact.

A need exists for a device which accurately detects optical radiation from the flash of a projectile impact with a target and quickly assesses an outcome of the impact.

OBJECTS OF THE INVENTION

It is, therefore, an object of the invention to provide a device for detecting optical radiation from the flash of a projectile impact with a target.

It is another object of the invention to provide a method for identifying a tank firing a projectile, using a device for detecting optical radiation from the flash of a projectile impact with a target.

It is yet another object of the invention to provide a method for determining a distance traveled by a projectile, using a device for detecting optical radiation from the flash of a projectile impact with a target.

It is yet another object of the invention to provide a method for ascertaining perforation of a target by a projectile, using a device for detecting optical radiation from the flash of a projectile impact with a target.

SUMMARY OF THE INVENTION

These and other objects, features and advantages are accomplished by the invention.

The invention includes an optical radiation detector, which detects optical radiation from the impact flash using optical, electronic and optoelectronic devices. The detector has a lens for collecting light from the impact flash, a spectral filter for isolating specific wavelength components in the radiation collected by the lens, an optoelectronic sensor for converting the focused image to an electrical signal, an amplifier for amplifying the electrical signal and display means for visually detecting and analyzing the electrical signal.

The invention may further include a pyrotechnic material, mounted on a projectile, for augmenting the flash of the projectile impact with the target. By analyzing the signatures of pyrotechnic materials via the optical radiation detector, one can easily identify which projectile impacted the target, determine the distance traveled by the projectile, and assess its impact by ascertaining from the flash whether the projectile perforated the target.

BRIEF DESCRIPTION OF THE DRAWINGS

FIG. 5 illustrates the spectral intensity from the impact flash, as detected by the optical radiation detector from a projectile containing a pyrotechnic material for augmenting its impact flash at all visible wavelengths, including a wavelength of 700 nm.

FIG. 6 illustrates the spectral intensity from the impact flash, as detected by the optical radiation detector from a projectile which does not contain a pyrotechnic material.

DESCRIPTION OF THE PREFERRED EMBODIMENTS

Figure 1:
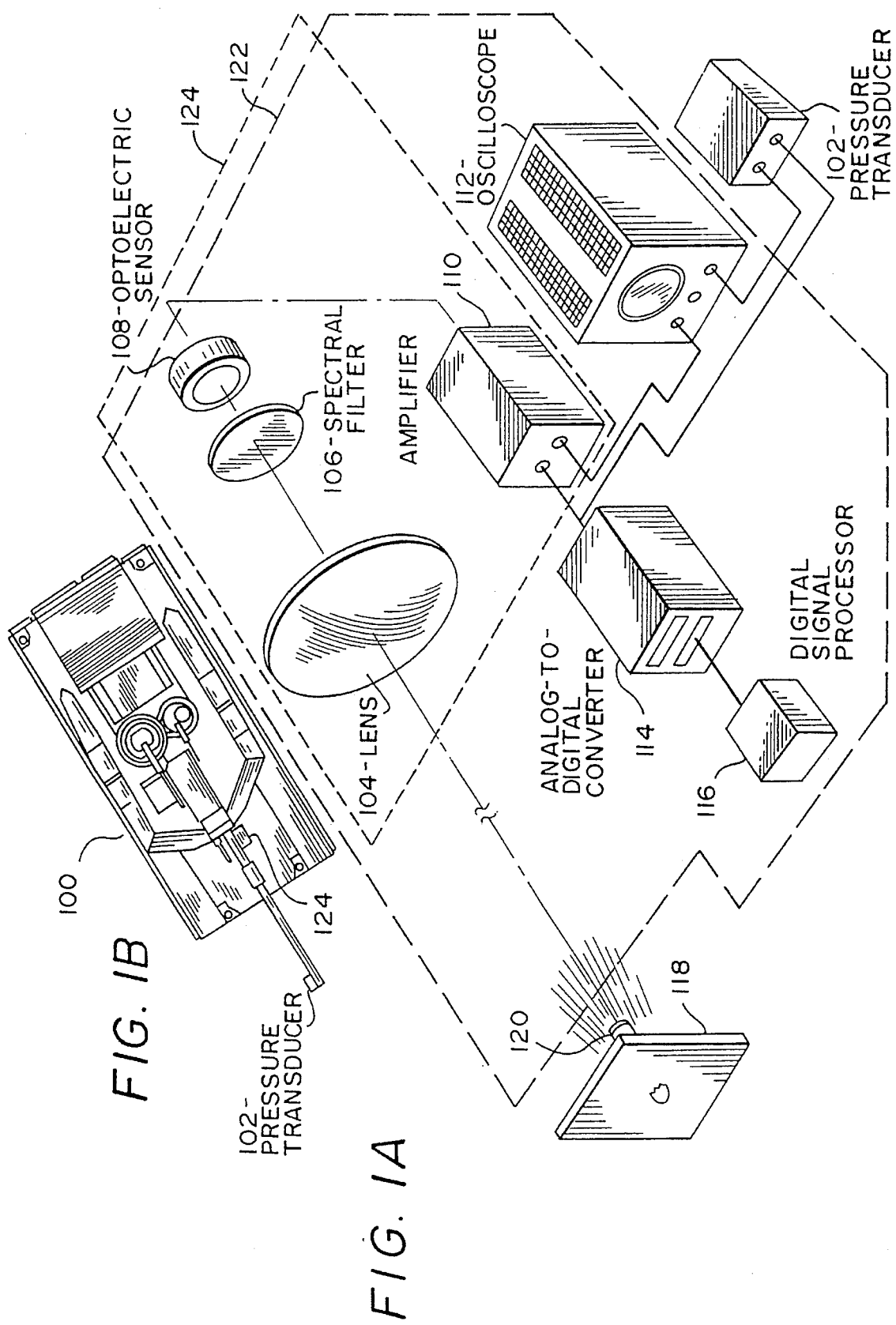
FIG. 1A is a schematic diagram of the optical radiation detector for detecting optical radiation of the impact flash of a projectile.
FIG. 1B shows the location of some components of the optical radiation detector which is carried by a tank.

The preferred embodiment of the invention includes two major components. The first component includes an optical radiation detector which detects visible light or infrared radiation from the flash produced from the projectile impact and converts the radiation into an electrical signal for display and analysis. The second component, an optical radiation augmenter, is added to the projectile and includes pyrotechnic materials to augment a flash of the impact for easier detection by the optical radiation detector.

In reference to the figures, like reference numerals designate like or corresponding parts throughout the views.

FIG. 1A is a schematic diagram of the optical radiation detector 122 for detecting IR or visible light, which is emitted from the flash of a projectile impact. After a tank 100 of FIG. 1B fires a projectile 120 at a target 118, a convex lens 104 collects optical radiation from the flash of the impact. Convex lens 104 focuses the optical radiation into an image. Next, a spectral filter 106 removes from the image all photons which have wavelengths outside the optimum passband. The filtered image is superimposed on a light-sensitive surface of an optoelectronic sensor 108, such as a silicon photodiode for visible light or an indium antimonide photovoltaic diode for sensing infrared radiation. The optoelectronic sensor 108 responds to the optical radiation by converting it into an electrical signal. The electrical signal, corresponding to the incident radiation, is amplified via an amplifier 110 and displayed on an oscilloscope 112. In addition, the analog electrical signal may be converted to a digital format via an analog-to-digital converter 114 and analyzed using a digital signal processor 116. The digital signal processor 116 may perform various digital signal processing operations, such as digital filtering or Fast Fourier Transform, for image enhancement or frequency display of the electrical signals from the optical radiation of the projectile.

FIG. 1B shows the location of some components of the optical radiation detector 122 of FIG. 1A, which is carried by the tank 100. The lens 104, the filter 106, the optoelectronic means 108 and the amplifier 110, which are designated with a reference numeral 124, are typically mounted on the exterior of the tank 100. The oscilloscope 112, as well as the analog-to-digital converter 114 and the digital signal processor 116, are usually located in the interior of the tank 100.

Figure 2:
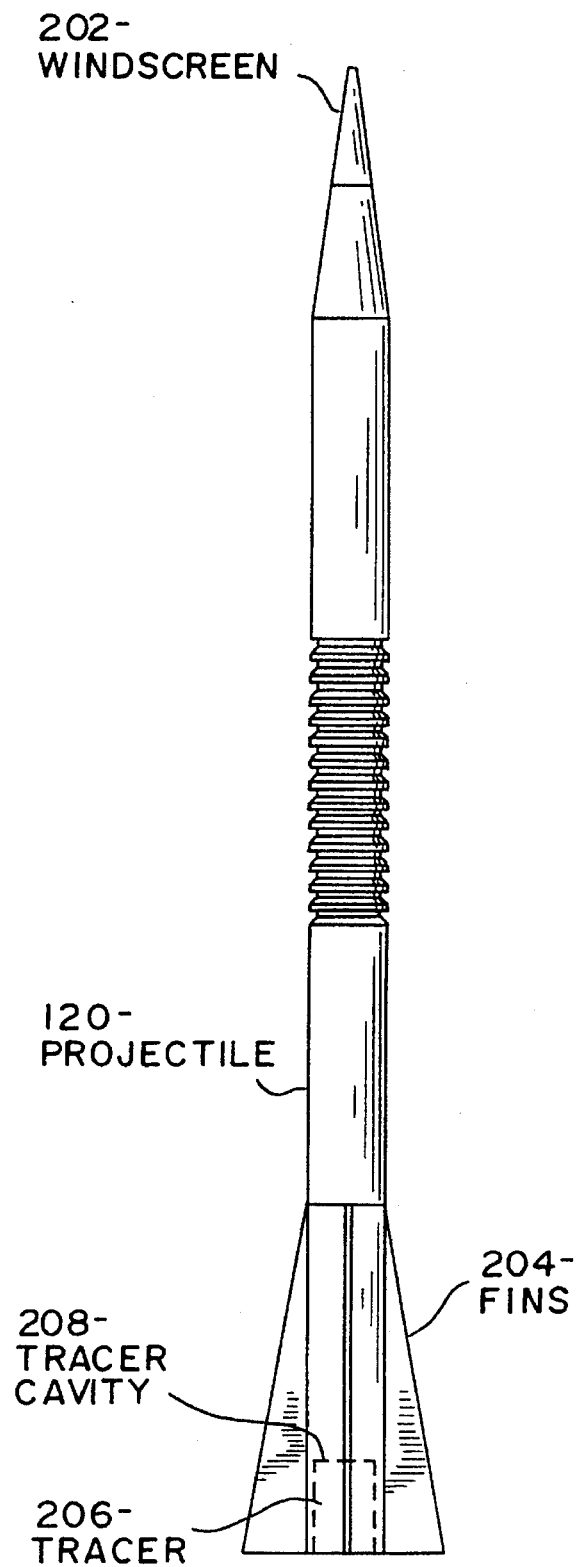
FIG. 2 is a plan view of a projectile which is equipped with pyrotechnic materials for intensifyiny optical radiation of an impact flash of the projectile.

As noted above, another component of the preferred embodiment of the invention includes the optical radiation augmenter, i.e., pyrotechnic materials, which are added to a projectile for intensifying optical radiation from the impact flash. FIG. 2 shows a typical projectile 120 equipped with pyrotechnic materials, which may be embedded, alloyed or affixed to stainless steel fins 204 and a windscreen 202. FIG. 2 further shows a tracer 206 being removed from the projectile 120, and replaced with pyrotechnic materials situated in a tracer cavity 208. As shown in FIG. 2, the pyrotechnic materials may be situated in the windscreen 202, the fins 204 or the tracer cavity 208 of the projectile 120. If the pyrotechnic materials are used for identifying a projectile 120 or determining the distance to a target 118, then the pyrotechnic materials are incorporated into the windscreen 202 or the fins 204 for better results. If, however, the pyrotechnic materials are used to assess the projectile impact by ascertaining whether it perforated the target 118, the pyrotechnic materials then are placed into the tracer cavity 208.

To identify a tank 100 firing a projectile 120, a pyrotechnic material is incorporated into the windscreen 202 or the fins 204 of the projectile 120. Each tank uses the projectiles containing a particular pyrotechnic material, which is unique to that tank. Upon impact with a hard surface at ballistic velocities, the pyrotechnic material promptly ignites and burns, resulting in intense visible or IR radiation having a characteristic pattern of wavelengths. Due to the different pyrotechnic materials, the projectiles from each tank emit optical radiation at a set of characteristic wavelengths, which is different from optical radiation emitted from other tanks. The characteristic optical radiation from a flash is, then, detected by the optical radiation detector 122 which identifies the particular type of a pyrotechnic generating the impact radiation, and consequently identifies which tank fired the projectile 120.

In one embodiment of the invention, the tank identification was demonstrated by providing an XM-881 projectile with a windscreen 202 containing pyrotechnic materials which produce radiation of characteristic wavelengths. The tracer 206 of the projectile 120 was removed to eliminate ambiguity in the source of the impact flash radiation. The optical radiation detector 122 included a spectral filter 106 having a passband, which corresponded to the characteristic wavelength of the radiation produced by the pyrotechnic materials. The optical radiation detector 122 was calibrated to record the amount of optical radiation that passed through a narrow, i.e., approximately 10 nm, spectral passband filter 106 while reaching the silicon photodiode 108 in sufficient quantities. By taking several factors into account, such as the distance to the flash, the transparency of the intervening optics path, the geometry of the optical system, etc., the amount of radiation emitted from the impact was accurately calculated. The intensity of radiation, i.e., spectral radiant intensity, was measured per unit of solid angle and unit of wavelength, resulting in watts per nanometer-steradian unit of measurement.

In this embodiment of the invention, the spectral radiant intensity at 589 nm and 776 nm wavelengths was noticeably larger than spectral radiant intensity at other wavelengths, and the tank 100 firing the projectile 120, which contained the pyrotechnic materials of the characteristic wavelengths, was easily identified. Even though this specific embodiment used sodium and potassium as the pyrotechnic materials, other materials could be used for identification purposes, including cesium, strontium, lithium, added to a windscreen or fins. Visual identification of large spectral radiant intensity at one or several wavelengths confirms that the flash could only have come from the tank which fired the projectile containing a particular pyrotechnic material. Furthermore, the digital signal processor 116 may perform various transforms on the displayed radiation which will further quantify the signatures created by the impact flash.

Figures 3, 4:
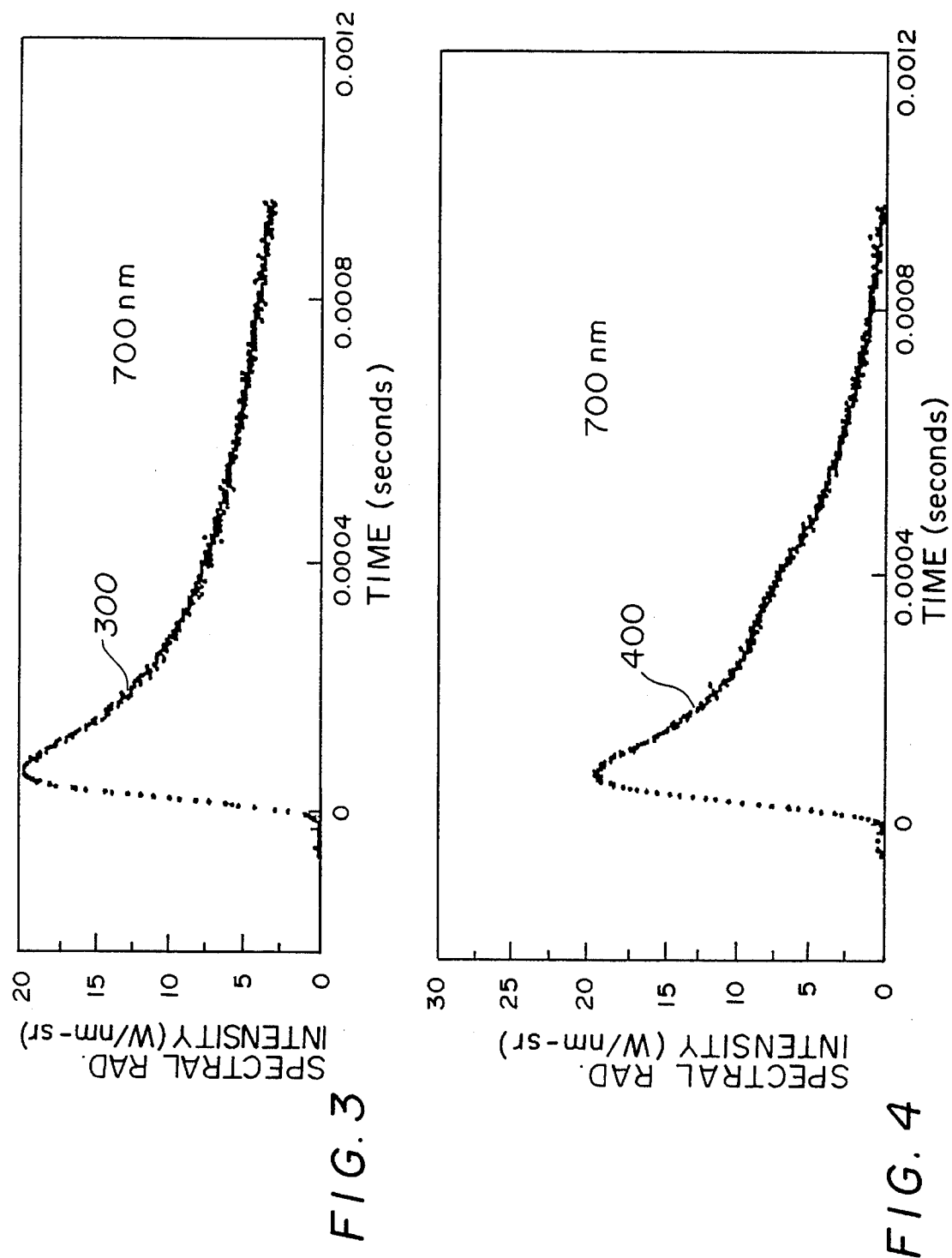
FIG. 3 illustrates the spectral intensity from the impact flash, as detected by the optical radiation detector from a projectile containing a pyrotechnic material impacting a target of 2.5 cm in thickness.
FIG. 4 illustrates the spectral intensity from the impact flash, as detected by the optical radiation detector from a projectile containing a pyrotechnic material impacting a target of 15 cm in thickness.

FIG. 3 and 4 show two graphs 300 and 400 of electrical signals generated by the optical radiation detector 122 from the impacting projectile 120 containing pyrotechnic materials in the windscreen 202 and the fins 204. The optical radiation detector 122 detected the flashes from two identical projectiles moving at 1280 m/sec, impacting slabs of rolled homogeneous armor. The detection included collecting the optical radiation by the lens 104, filtering the collected optical radiation by the spectral filter 106 and converting the filtered optical radiation into an electrical signal by the optoelectronic sensor 108. After amplification by the amplifier 110, the electrical signal was displayed in a time domain on the oscilloscope 112. The spectral radiant intensity at the 700 nm wavelength was measured on a microsecond by microsecond basis from two projectile impacts. The graph 300 shows the first projectile 120 impacting a target 118 of 2.5 cm in thickness, and the graph 400 shows the second projectile 120 impacting another target 118 of 15 cm in thickness. The graphs 300 and 400 show the radiant intensity of the flash growing very rapidly, reaching a maximum value in a few tens of microseconds, providing an almost instantaneous assessment of the impact.

The radiant intensity of the flash decays relatively slowly, disappearing after a millisecond. The optical radiation, produced by the impact, is detectable at distances of a few kilometers over visible or mid-IR wavelengths, using the optical radiation detector 122.

FIG. 5 is a graph 500 of an electrical signal from the impact flash, as detected by the optical radiation detector 122, where a projectile 120 contains a pyrotechnic material for augmenting its impact flash. FIG. 6 is a graph of an electrical signal from the impact flash, as detected by the optical radiation detector 122, where a projectile 120 does not contain a pyrotechnic material. A spectral radiant intensity at 700 nm wavelength is shown in graphs 500 and 600 for the two projectiles impacting identical targets. The radiant intensity of the graph 500 is significantly larger, in magnitude and duration, than the radiant intensity of the graph 600. The impact of a projectile with a windscreen or fins containing pyrotechnic materials would be much easier to detect by the optical radiation detector 122, confirming the importance of the optical radiation augmenter.

To determine the distance traveled by a projectile, a pyrotechnic material is incorporated into the windscreen 202 or the fins 204 of the projectile 120 in close analogy with the embodiments of projectile identification. One precisely measures a flight time, needed for the projectile 120 to travel from a tank 100 to a target 118. Since the flight speed of projectiles are well known and extensively tabulated in ballistic firing tables, the flight time can be easily converted into flight distance.

To determine the flight time, one must know precisely when the flight started and when it stopped. As shown in FIG. 1A and 1B, a start mark can be derived from a pressure transducer 102 attached to the tank 100 and connected to the oscilloscope 112. When the projectile 120 is fired from the tank 100, the pressure transducer 102, which may be a piezoelectric pressure gauge, responds to the mechanical shock. The pressure transducer 102 converts the sound energy from the firing of the projectile 120 into an electrical signal 800 which is displayed in a time domain for visual identification of the start time of the time interval, as shown in FIG. 8. In contrast to FIG. 3–7 displaying time measurements in microseconds, FIG. 8 shows a compressed time base measured in seconds, because the flight time of a projectile 120 may last for several seconds. The pressure transducer 102, mounted in the tank gun muzzle, produced timing errors less than a few tens of microseconds, which was insignificant in the present context.

FIG. 8 further shows the electrical signal 802 from the impact flash, as detected by the optical radiation detector 122 via collecting the optical radiation by the lens 104, filtering the collected radiation by the spectral filter 106 and converting the filtered radiation into an electrical signal by the optoelectronic sensor 108. After amplification by the amplifier 110, the electrical signal 802 is displayed in a time domain on the oscilloscope 112. The electrical signal 802 provides a clear end mark of the projectile flight time. The flight time, as determined from the peaks of the signals 800 and 802, is then used to calculate a distance to the target 118 using the flight speed of the projectile 120.

The pressure transducer 102 may also be connected to the digital signal processor 116 via the analog-to-digital converter 114. The digital signal processor 116 will calculate the flight time from the signals 800 and 802, representing the start and end marks of the projectile flight, respectively. In addition, the digital signal processor 116 may also calculate the flight distance directly from the time-based signals 800 and 802, provided the speed of various projectiles is available in a digital format for processing by the digital signal processor 116.

During the rapid rise of the radiant intensity from the flash as shown in graphs 300 and 400, the projectile travels only a distance of the order of its own length. In comparison with a typical projectile flight of a few kilometers, the impact distance can be determined with an uncertainty of less than 1% over the entire effective range of the projectile. As mentioned earlier, the resulting flight time is converted to a distance traveled by a projectile 120, using the ballistic firing tables.

To assess the projectile impact by ascertaining whether it perforated the target 118, a pyrotechnic material is placed at the rear of the projectile body 120, either in front of the tracer 206 or replacing it. The pyrotechnic material can also be incorporated into the tracer 206. The pyrotechnic material is ignited and burnt from the shock of the projectile impact with the target 118. The pyrotechnic material burns at a rapid rate and emits optical radiation from the combustion. If the projectile 120 has perforated the tank 100, the optical radiation from the pyrotechnic material is discharged into the interior of the tank 100 and is not visible from the outside. On the other hand, if the projectile 120 is stopped by the target 118, the optical radiation from the pyrotechnic material gushes to the outside through the hole created by the projectile 120, and is detected by the optical radiation detector 122. The effectiveness of the optical radiation augmenter is evident as it emits IR radiation in 2000 to 5000 nm spectrum, where the radiation readily passes through smoke and dust. This detected radiation is converted to an electrical signal and displayed on an expanded time base of the oscilloscope 112.

In one embodiment of the invention, the tracer 206 was removed from an XM-881 projectile 120. A few drops of an epoxy adhesive, acting as a pyrotechnic material, was placed into the tracer cavity 208. After the epoxy adhesive thoroughly hardened, the projectile 120 was fired at a target 118.

Figure 7:
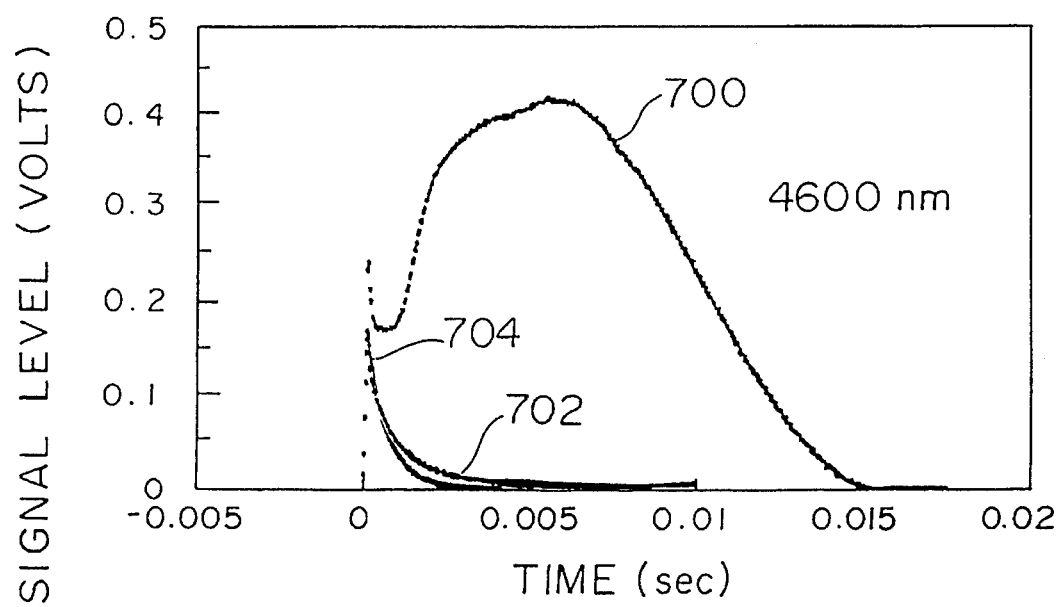
FIG. 7 is illustrates the optical radiation detector signal produced from the impact flashes, where some of the projectiles perforated the target and others failed to perforate the target.
Figure 8:
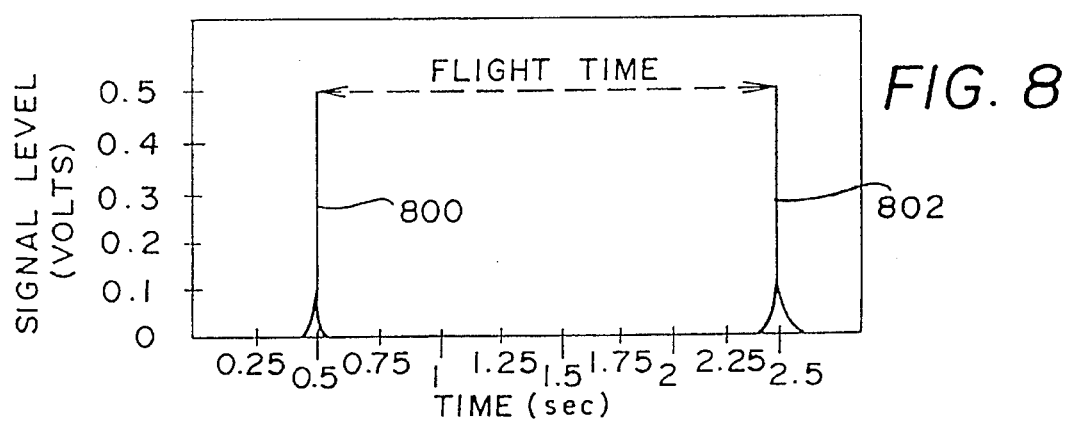
FIG. 8 illustrates a time-domain representation of the pressure transducer signal and the optical radiation detector signal for determining a projectile flight time.

FIG. 7 shows the effect of the optical radiation augmenter in ascertaining the perforation of the target 118 from three projectiles. Two projectiles were prepared by replacing the tracer 206 with the epoxy adhesive and one projectile was without the epoxy adhesive. The optical radiation detector 122 collects the optical radiation using the lens 104, filters the collected radiation using the spectral filter 106 and converts the filtered radiation into an electrical signal using the optoelectronic sensor 108. After amplification by the amplifier 110, the electrical signals 700, 702 and 704 are displayed in a time domain on the oscilloscope 112. The graph 700 shows the signal from the flash, as detected by the optical radiation detector 122 at the 4600 nm wavelength, when the target 118 was not perforated by the epoxy-loaded projectile. The graph 702 shows the signal from the flash at the same wavelength, when the projectile 120, absent the epoxy adhesive, impacted and failed to perforate the target 118 of the same thickness. The graph 704 shows the signal from the flash for an epoxy-loaded projectile 120 that perforated the target 118. Comparison between the graphs 700 and 704 demonstrates that the indication of the perforation is very pronounced. A comparison between the graphs 700 and 702 confirms the effectiveness of the epoxy adhesive for intensifying the optical radiation for better detection.

Since those skilled in the art can modify the disclosed specific embodiment without departing from the spirit of the invention, it is, therefore, intended that the claims be interpreted to cover such modifications and equivalents.

What is claimed is:

1. A device for detecting optical radiation from a flash of a projectile impact with a target, comprising:

a lens for collecting the optical radiation from the impact;

a spectral filter for focusing an image collected by said lens;

an optoelectronic sensor for converting the image focused by said spectral filter to an electrical signal;

an amplifier connected to said optoelectronic sensor for amplifying the electrical signal;

display means connected to said amplifying means for displaying the electrical signal for visual analysis; means connected to said amplifier, for converting an analog electrical signal to a digital electrical signal and processing the digital electrical signal;

further comprising a pressure transducer connected to said display means, for converting sound energy from a fired projectile into electrical energy to mark a start of a flight time of the projectile to determine a distance to a target.

2. A method for determining a distance traveled by a projectile, comprising:

adding at least one pyrotechnic material to the projectile for augmenting optical radiation from an impact flash with a target;

measuring a flight time of the projectile from the steps of:
detecting a launch time of the projectile for a start of the flight time;
detecting optical radiation from the impact flash comprising the steps of:
(a) collecting the optical radiation through a lens from the impact flash,
(b) spectral filtering the optical radiation collected by the lens,
(c) converting optical radiation from the spectral filter into an electrical signal,
(d) amplifying the electrical signal and
(e) displaying the amplified electrical signal for visual analysis;
determining the flight time of the projectile from the launch time and an end of flight time corresponding to the time the impact flash is detected; and calculating the distance of the impact from the flight time of the projectile.

3. The method according to claim 2, wherein said detecting a launch time of the projectile comprises the steps of:

attaching a pressure transducer to a tank, connecting the pressure transducer to the display means, converting with the pressure transducer sound energy from a fired projectile into electrical energy, and marking on the display means a start of a flight time of the projectile.

4. The method according to claim 2, wherein said adding at least one pyrotechnic material to the projectile comprises attaching a windscreen with said at least one pyrotechnic material to the projectile for augmenting optical radiation from an impact flash with a target.

5. The method according to claim 2, wherein said adding at least one pyrotechnic material to the projectile comprises attaching fins with at least one pyrotechnic material to the projectile for augmenting optical radiation from an impact flash Mth a target.

6. A method for identifying a tank firing a projectile which impacts a target, comprising:

adding at least one pyrotechnic material to the projectile for augmenting an optical radiation from an impact flash at a characteristic wavelength, the pyrotechnic material being selected from a group consisting of cesium, strontium, lithium, sodium and potassium;

detecting the optical radiation from the impact flash comprising the steps of:
(a) collecting the optical radiation through a lens from the impact flash,
(b) spectral filtering the collected radiation,
(c) converting the filtered radiation to an electrical signal,
(d) amplifying the electrical signal and
(e) displaying the amplified electrical signal for visual analysis; and determining the presence of optical radiation having the characteristic wavelength produced by the impact flash of the projectile upon impacting a target from the displayed electrical signal.

7. A method for ascertaining a perforation of a target upon an impact by a projectile, comprising:

adding at least one pyrotechnic material to a rear interior of the projectile for augmenting an optical radiation from an impact flash at a characteristic wavelength, the pyrotechnic material being selected from a group consisting of cesium, strontium, lithium, sodium and potassium;

detecting the optical radiation from the impact flash comprising the steps of:
(a) collecting the optical radiation through a lens from the impact flash,
(b) spectral filtering the collected radiation,
(c) converting the filtered radiation to an electrical signal,
(d) amplifying the electrical signal and
(e) displaying the amplified electrical signal for visual analysis; and determining the presence of optical radiation having the characteristic wavelength produced by the impact flash of the projectile upon impacting a target from the displayed electrical signal.

8. The method according to claim 7, wherein said spectral filtering comprises passing the optical radiation having wavelengths of substantially between 2000 nm and 5000 nm.

9. The method according to claim 7, wherein said spectral filtering comprises passing the optical radiation having a wavelength of 4600 nm.

* * * * *